(12) United States Patent
Kawamura

(10) Patent No.: US 7,581,391 B2
(45) Date of Patent: Sep. 1, 2009

(54) HYDRODYNAMIC TORQUE TRANSMITTING DEVICE

(75) Inventor: Takashi Kawamura, Nara (JP)

(73) Assignee: Exedy Corporation, Osaka (JP)

( * ) Notice: Subject to any disclaimer, the term of this patent is extended or adjusted under 35 U.S.C. 154(b) by 307 days.

(21) Appl. No.: 11/661,546

(22) PCT Filed: Aug. 3, 2005

(86) PCT No.: PCT/JP2005/014218

§ 371 (c)(1),
(2), (4) Date: Mar. 1, 2007

(87) PCT Pub. No.: WO2006/025178

PCT Pub. Date: Mar. 9, 2006

(65) Prior Publication Data

US 2008/0190102 A1 Aug. 14, 2008

(30) Foreign Application Priority Data

Sep. 2, 2004 (JP) ............................. 2004-255535

(51) Int. Cl.
*F16D 33/00* (2006.01)
(52) U.S. Cl. .......................................... 60/330; 60/364
(58) Field of Classification Search .................... 60/330, 60/339, 361, 364, 365, 366, 367; 192/3.28, 192/110 B; 384/420
See application file for complete search history.

(56) References Cited

U.S. PATENT DOCUMENTS 5,255,516 A * 10/1993 Ejiri et al. ..................... 60/365
5,737,836 A 4/1998 Finn et al.

FOREIGN PATENT DOCUMENTS

| JP | 57-029851 A | 2/1982 |
| JP | 62-015646 U | 1/1987 |
| JP | 01-149055 U | 10/1989 |
| JP | 10-299858 A | 11/1998 |
| JP | 11-082675 A | 3/1999 |

* cited by examiner

*Primary Examiner*—Michael Leslie
(74) *Attorney, Agent, or Firm*—Global IP Counselors, LLP

(57) ABSTRACT

A torque converter 1 transmits torque from the engine to an output shaft. The torque converter 1 includes a front cover 2, impeller 3, and turbine 4. The turbine 4 includes a turbine shell 11 located opposite the impeller 3 and provided with a plurality of blades, and a turbine hub 13 located at a radially inner end of the turbine shell 11 to couple the turbine shell 11 with the output shaft. The torque converter 1 further includes an annular slide member 80 located between the front cover 2 and the turbine hub 13 in the axial direction to receive the axial load, and a support member 70 fixed to one of the front cover 2 and the turbine hub 13 to support the slide member 80 by urging the slide member 80 against one of the front cover 2 and the turbine hub 13 in the axial direction.

20 Claims, 4 Drawing Sheets

HYDRODYNAMIC TORQUE TRANSMITTING DEVICE

TECHNICAL FIELD

The present invention relates to a hydrodynamic torque transmitting device, particularly, to a hydrodynamic torque transmitting device equipped with a lock-up clutch.

BACKGROUND ART

As one type of a hydrodynamic torque transmitting device, torque converters have been known. Torque converters are apparatuses that transmit torque from the engine to the transmission via fluids therein, and mainly include a front cover to which the torque is input from the engine, an impeller provided with the front cover, a turbine located opposite the impeller, a stator to adjust the flow of the fluids from the turbine to the impeller, a stator support mechanism for supporting the stator, and a lock-up clutch for mechanically coupling the front cover with the turbine. A fluid chamber, constituted by the front cover and the impeller, is filled with fluid such as an operating oil.

The turbine is furnished with a turbine shell that is located opposite the impeller and is provided with a plurality of turbine blades, and a turbine hub that is located at a radially inner end of the turbine shell to couple the turbine shell with the output shaft. In addition, in order to support the axial load applying to the turbine hub by the pressure in the torus, an annular thrust washer is provided between the front cover and the turbine hub in the axial direction. Conventional thrust washers are made of plastic, for example, and are fitted into stepped portions either on the front cover side or on the turbine hub side. It is necessary for the operating oil to flow in the radial direction at a place where the thrust washer is located in order to move the piston of the lock-up clutch. Therefore, the thrust washer is formed with a plurality of grooves communicating in the radial direction (Refer to Patent Document 1, for example).

Patent Document 1: Japanese Unexamined Patent Publication H10-299858

DISCLOSURE OF INVENTION

Problems to be Solved by the Invention

Considering the flow of the operating oil through the thrust washer, however, the sheet-metal thickness of the thrust washer needs a thickness for engagement with the stepped portion and a thickness for forming the grooves. On the other hand, a synthetic resin thrust washer cannot be excessively thinned to ensure the necessary strength. Therefore, the sheet-metal thickness of the thrust washer cannot be thinned so that it becomes difficult to shorten the axial dimension at and around the radially inner portion of the torque converter. The miniaturization of the torque converter has considerable advantages such as weight reduction of the vehicle, improvement of fuel economy, and so on.

It is an object of the present invention to shorten the axial dimension at and around the radially inner portion of the hydrodynamic torque transmitting device by devising structures at and around the thrust washer.

Means for Solving Problems

A hydrodynamic torque transmitting device according to a first aspect of the present invention transmits torque from an engine to an output shaft extending toward a transmission through fluids. The device has: a front cover to which the torque from the engine is input, the front cover being located near the engine; an impeller being located on a side of the front cover near the transmission, the impeller forming a fluid chamber with the front cover and having a plurality of blades on an inner surface thereof; and a turbine being located in the fluid chamber on a side of the impeller near the engine, the turbine being capable of outputting the torque to the output shaft. The turbine includes a turbine shell that is located opposite the impeller and is provided with a plurality of blades, and a turbine hub located at a radially inner end of the turbine shell to couple the turbine shell with the output shaft. The device further has: an annular slide member being located between the front cover and the turbine hub in the axial direction to receive the axial load; and a support member being fixed to one of the front cover and the turbine hub to support the slide member by urging the slide member in the axial direction against one of the front cover and the turbine hub.

In the hydrodynamic torque transmitting device, since the slide member is supported by the support member while being urged, it is unnecessary to form a stepped portion in the front cover or the turbine hub into which a thrust washer is to be fitted, unlike the conventional art. Accordingly, a thickness of a portion of the slide member, which was engaged with the stepped portion, can be thinned so that the sheet-metal thickness of the slide member can therefore be thinned. As a result, it is possible to shorten the axial dimension at and around the radially inner portion of the hydrodynamic torque transmitting device.

A hydrodynamic torque transmitting device according to a second aspect of the present invention is the device according to the first aspect, wherein the support member includes an annular portion, and a plurality of projections projecting from the annular portion in the radial direction to urge the slide member in the axial direction.

In the hydrodynamic torque transmitting device, since the support member is formed with a plurality of projections, it is possible to urge the slide member at several points in the axial direction, thereby more reliably supporting the slide member.

A hydrodynamic torque transmitting device according to a third aspect of the present invention is the device of the second aspect, wherein the slide member is formed with a plurality of recesses to be engaged with the projections.

In the hydrodynamic torque transmitting device, since the support member is formed with recesses to be engaged with the projections, i.e., portions depressed in the through-thickness direction, it is possible to engage the projections with the recesses in the circumferential direction. As a result, it is possible to support the slide member by the support member against one of the front cover and the turbine hub so as to be relatively unrotatable. Furthermore, in the hydrodynamic torque transmitting device, since the sheet-metal thickness of the projection can be accommodated within the axial dimension of the recess, the projections do not interfere with a member opposite the slide member.

A hydrodynamic torque transmitting device according to a fourth aspect of the present invention is the device of the second or third aspect, wherein the projections are elastically deformed in the axial direction to urge the slide member.

In the hydrodynamic torque transmitting device, since the projections are elastically deformed in the axial direction, the urging force can be applied to the slide member by the elastic force of the projections. Accordingly, it is possible to restrict easily the movements of the slide member in the axial and circumferential directions.

A hydrodynamic torque transmitting device according to a fifth aspect of the present invention is the device of the third or fourth aspect, wherein the projection includes an urging portion engaged with the recess to urge the slide member, and a bent portion bent in the axial direction to couple the annular portion with the urging portion.

In the hydrodynamic torque transmitting device, since the projection includes the urging portion and the bent portion, the amount of the elastic deformation of the projections can be adjusted at the attachment by the degree of bending of the bent portion, thereby adjusting the urging force.

A hydrodynamic torque transmitting device according to a sixth aspect of the present invention is the device of any of the first through fifth aspects, wherein the support member is located radially outward of the slide member.

In the hydrodynamic torque transmitting device, since the support member is located radially outward of the slide member, the radially inner end of the support member and the radially outer end of the slide member are engaged with each other, thereby stabilizing the position of the slide member in the radial direction.

A hydrodynamic torque transmitting device according to a seventh aspect of the present invention is the device of any of the third through sixth aspects, wherein the slide member is formed with a plurality of grooves penetrating in the radial direction, and the grooves are located between the recesses in the circumferential direction.

In the hydrodynamic torque transmitting device, since the slide member is formed with the grooves, the slide member does not hinder the flow of the fluids.

A hydrodynamic torque transmitting device according to an eighth aspect of the present invention is the device of any of the third through seventh aspects, wherein a gap between the projections and the recesses in the circumferential direction is in the range between 0 mm and 0.2 mm.

In the hydrodynamic torque transmitting device, since the gap between the projections and the recesses in the circumferential direction is in the range between 0 mm and 0.2 mm, the support member can restrict the movement of the slide member in the circumferential direction more reliably. Accordingly, the wear of the engagement portion between the projections and the recesses in the circumferential direction can be reduced.

A hydrodynamic torque transmitting device according to a ninth aspect of the present invention is the device of the seventh or eighth aspect, wherein an area occupied by the grooves in the slide member is equal to or more than 50% of a sliding area in the slide member.

In the hydrodynamic torque transmitting device, since an area occupied by the grooves is equal to or more than 50% of a sliding area, the depth of the groove can be shallower compared to the conventional arts, thereby thinning the sheet-metal thickness of the slide member. Furthermore, in the hydrodynamic torque transmitting device, the depth of the groove can be shallower compared to the conventional arts. As a result, it is possible to employ press work even if the slide member is made of metal, thereby reducing the cost compared to machine work.

A hydrodynamic torque transmitting device according to a tenth aspect of the present invention is the device of the first through ninths aspects, wherein the slide member and the support member are made of metal.

In the hydrodynamic torque transmitting device, since the slide member is made of metal, it is possible to thin the sheet-metal thickness compared to the conventional synthetic resin thrust washer while ensuring the strength. Furthermore, in the hydrodynamic torque transmitting device, since the support member is made of metal, the sheet-metal thickness of the support member can be thinned, too. Furthermore, in the hydrodynamic torque transmitting device, since the slide member and the support member are made of metal, it is possible to prevent the engagement portion between the support member and the slide member from being worn.

EFFECT OF THE INVENTION

In the hydrodynamic torque transmitting device according to the present invention, by devising structures at and around the thrust washer, it is possible to shorten the axial dimension at and around the radially inner portion of the hydrodynamic torque transmitting device.

Figure 1:
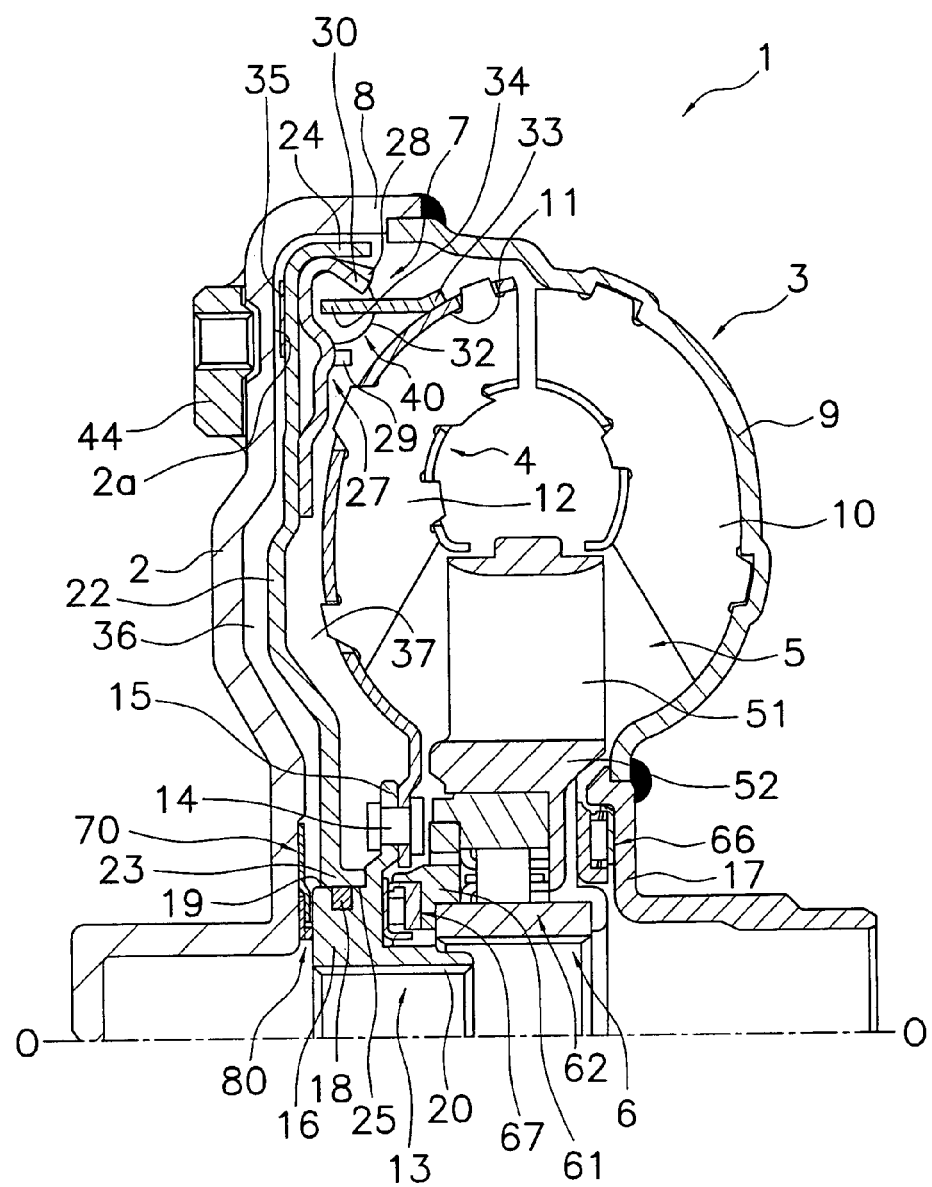
FIG. 1 is a schematic longitudinal sectional view of the torque converter 1 according to one embodiment of the present invention.

EXPLANATIONS OF LETTERS OR NUMERALS 1 torque converter
2 front cover
3 impeller
4 turbine
5 stator
6 stator support mechanism
7 lock-up clutch
13 turbine hub
70 support member
71 annular portion
72 projections
73 urging portion
74 bent portion
75 cutouts
76 fixing portion
80 slide member
81 main body
82 recesses
83 groove
84 sliding surface
90 attachment portion

BEST MODE FOR CARRYING OUT THE INVENTION

Hereinafter, a description will be made of one embodiment of the present invention with reference to figures.

1. Structure of the Torque Converter

FIG. 1 is a schematic longitudinal sectional view of a torque converter 1 according to one embodiment of the present invention. The line O-O in FIG. 1 is the axis of rotation of the torque converter 1.

In FIG. 1, the torque converter 1 has a front cover 2, and an impeller shell 9 fixed to a radially outer projection 8 of the front cover 2 to constitute a hydraulic oil chamber. The front cover 2 can be attached to a crankshaft (not shown) by components so that the torque is input to the front cover 2. The impeller shell 9 has an inner side to which a plurality of impeller blades 10 is fixed (later described). The impeller shell 9 and the impeller blades 10 constitute an impeller 3. In the hydraulic oil chamber, a turbine 4 is located opposite the impeller 3. The turbine 4 is constituted by a turbine shell 11 and a plurality of turbine blades 12 fixed to the turbine shell 11. The turbine shell 11 has a radially inner end fixed to a flange 15 of a turbine hub 13 by rivets 14. The turbine hub 13 is formed with splined slots 20 on an inner circumference thereof with which a main drive shaft (not shown) of the transmission is engaged. A stator 5 is located between a radially inner portion of the impeller 3 and a radially inner portion of the turbine 4.

The stator 5 serves to adjust the direction of the operating oil returning from the turbine 4 to the impeller 3, and is supported by a fixed shaft (not shown) via a stator support mechanism 6 (later described) so as to be rotatable only in one direction. The fixed shaft is a cylindrical member extending from the transmission through which the main drive shaft extends. The stator 5 is constituted by a stator hub 52 supported by a stator support mechanism 6 and a plurality of stator blades 51 formed on the outer circumference of the stator hub 52.

2. Structure of the Lock-Up Clutch

A lock-up clutch 7 is located in a space between the front cover 2 and the turbine 4, and is a device to couple mechanically the front cover 2 with the turbine 4. The lock-up clutch 7 is mainly constituted by a piston 22, and an elastically coupling mechanism 40 to couple elastically the piston 22 with the turbine 4.

The piston 22 is a disc-like member, and is located so as to divide the space between the front cover 2 and the turbine shell 11 into a first hydraulic chamber 36 near the front cover 2 and a second hydraulic chamber 37 near the turbine 4. The piston 22 is a plate metal having a small thickness. The piston 22 has a radially inner cylindrical portion 23 extending toward the transmission at the radially inner end. The radially inner cylindrical portion 23 is supported on an outer surface 19 of a tubular portion 16 formed at the radially innermost portion of the flange 15 of the turbine hub 13 so as to be relatively movable in the axial direction and the circumferential direction. In other words, an inner surface 25 of the radially inner cylindrical portion 23 is in contact with the outer surface 19 of the tubular portion 16. An annular groove is formed at the axially intermediate position of the outer surface 19 of the tubular portion 16, in which a seal ring 18 is disposed. The seal ring 18 is in contact with the inner surface 25 of the radially inner cylindrical portion 23. Accordingly, the seal ring 18 serves as a seal for the radially inner portions of the first hydraulic chamber 36 and the second hydraulic chamber 37.

A radially outer cylindrical portion 24 extending toward the transmission is formed at a radially outer portion of the piston 22. In addition, an annular friction facing 35 is adhered onto an engine-side of the radially outer portion of the piston 22. The friction facing 35 is opposed to an annular and flat friction surface 2a formed on an inner side of the radially outer portion of the front cover 2. The engagement between the friction facing 35 and the friction surface 2a of the front cover 2 constitutes a seal for the radially outer portions of the first hydraulic chamber 36 and the second hydraulic chamber 37.

The elastically coupling mechanism 40 is located between the piston 22 and the turbine 4, more specifically, between the radially outer portion of the piston 22 and the radially outer portion of the turbine shell 11. The elastically coupling mechanism 40 is constituted by a retaining plate 27 as a drive member, a driven plate 33 as a driven member, and a plurality of coil springs 32 located between both the plates 27 and 33. The retaining plate 27 is an annular plate member located on a side of the radially outer portion of the piston 22 near the transmission, i.e., radially inward of the radially outer cylindrical portion 24. The retaining plate 27 has a radially inner portion fixed to the piston 22 by a plurality of rivets (not shown). The retaining plate 27 is a member that holds the coil springs 32, and is engaged with the circumferential ends of the coil springs 32 to transmit torque thereto. The retaining plate 27 has retaining portions 28 and 29 to support radially outer and inner sides of the coil springs 32 respectively arranged in the circumferential direction. The radially inner retaining portions 29 are portions cut out from the disc portion of the retaining plate 27. Furthermore, the retaining plate 27 has engagement portions 30 to support the circumferential ends of the coil springs 32. The driven plate 33 is an annular plate member fixed to a rear face of the radially outer portion of the turbine shell 11. The driven plate 33 is formed with a plurality of claws 34 extending toward the engine at several positions arranged in the circumferential direction. The claws 34 are engaged with the circumferential ends of the coil springs 32. Accordingly, the torque from the retaining plate 27 is transmitted to the driven plate 33 via the coil springs 32.

3. Structures of the Stator Support Mechanism and its Surroundings

The stator support mechanism 6 is constituted by the one-way clutch 62, a first thrust bearing 66, a second thrust bearing 67, and a retainer 61. The one-way clutch 62 is located radially inward of the stator hub 52 and supports the stator hub 52 so as to be rotatable relative to the fixed shaft only in one direction. The first thrust bearing 66 is located on an axial-transmission side of the stator hub 52, and is located between the stator hub 52 and an impeller hub 17. The second thrust bearing 67 is located on the axial-engine side of the one-way clutch 62. The retainer 61 is an annular member located between the one-way clutch 62 and the second thrust bearing 67 in the axial direction.

The second thrust bearing 67 is sandwiched between the retainer 61 and the turbine hub 13. The turbine hub 13 can move in the axial direction when receiving the axial load because it is spline-engaged with the main drive shaft. An annular slide member 80 is provided between the front cover 2 and the turbine hub 13 to receive the axial load from the turbine hub 13. The slide member 80 is supported by an annular support member 70 against the front cover 2.

Figure 2:
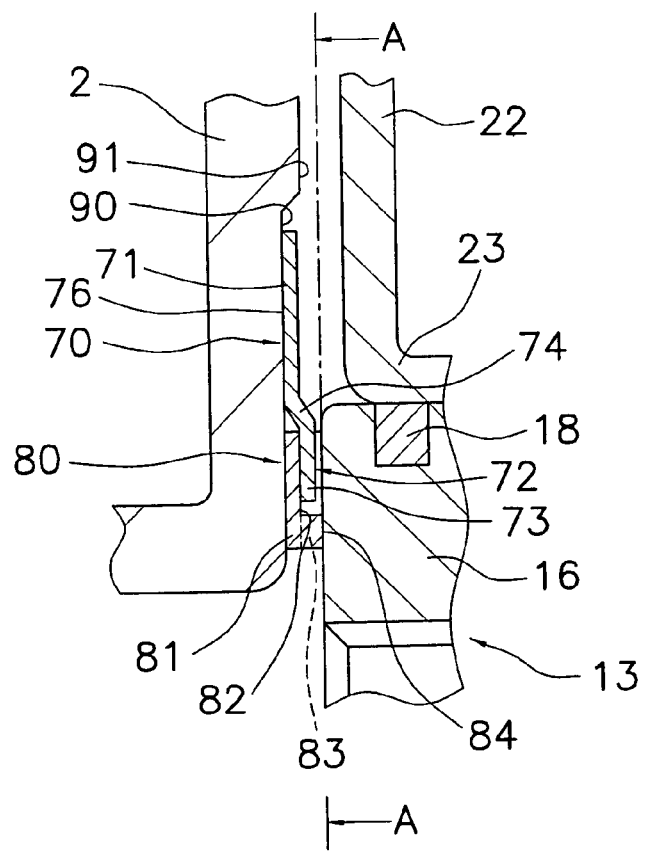
FIG. 2 is a schematic longitudinal sectional view of the support member 70 and the slide member 80 and their surroundings.
Figure 3:
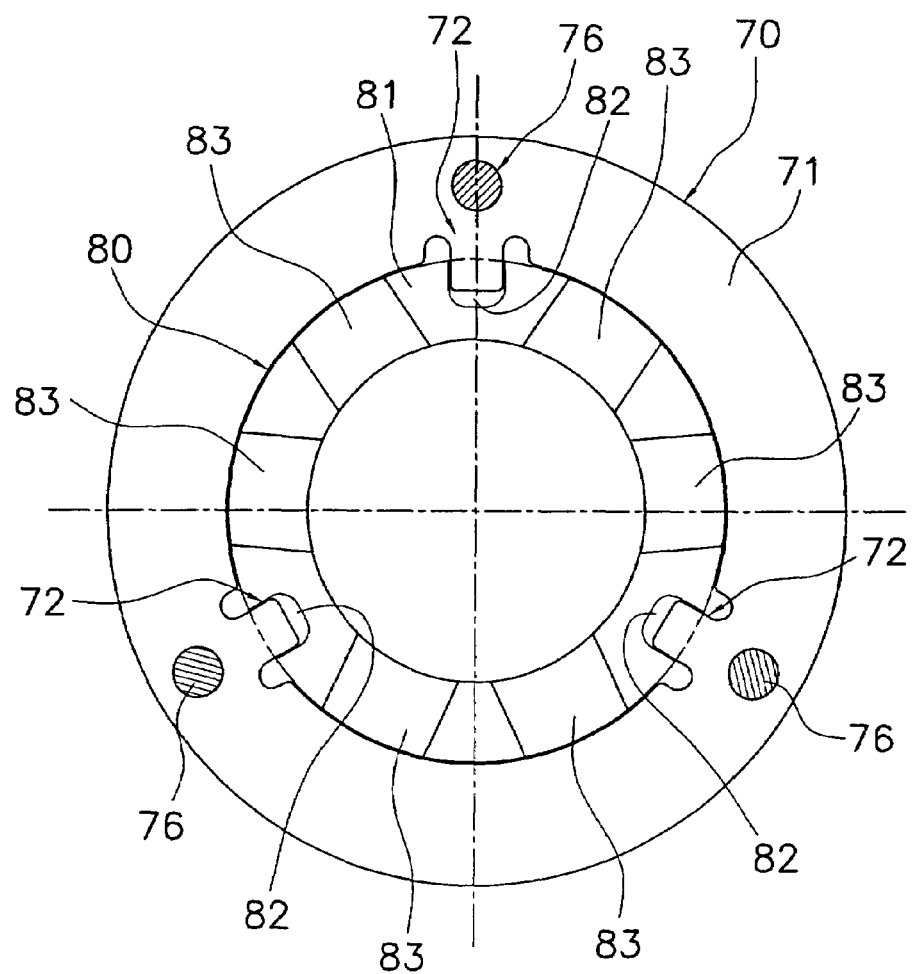
FIG. 3 is a plan view of the support member 70 and the slide member 80.

4. Structures of the Supporting Member, the Slide Member, and their Surroundings FIG. 2 is a schematic longitudinal sectional view of the support member 70 and the slide member 80 and their surroundings. FIG. 3 is a plan view of the support member 70 and the slide member 80.

(1) Structure of the Slide Member

The slide member 80 is, as shown in FIG. 2 and FIG. 3, constituted by a main body 81, which is formed with recesses 82 and grooves 83. The main body 81 is a member that forms a main part of the slide member 80, and has main surfaces that are in contact with the axial surface of the front cover 2 and the axial surface of the turbine hub 13. The recesses 82 are portions to be engaged with projections 72 of the support member 70, and are formed on the axial-transmission side of the radially outer portion of the main body 81, i.e., on the side near the turbine hub 13. The grooves 83 are grooves penetrating in the radial direction, and are formed on the axial-engine side of the main body 81, i.e., on the side near the turbine hub 13. The grooves 83 are flow passages for the operating oil so that the operating oil can flow through the grooves 83 in the radial direction when the lock-up clutch 7 is operated, for example. In this embodiment, the number of the grooves 83 is six, and each two of them is located between the recesses 82 in the circumferential direction.

(2) Structure of the Support Member

The support member 70 is, as shown in FIG. 2, a member to urge the slide member 80 against the front cover 2 toward the engine in the axial direction. The support member 70 is constituted by an annular portion 71 and projections 72. The annular portion 71 is, as shown in FIG. 3, an annular and plate-like portion having a main part of the support member 70. The annular portion 71 is located radially outward of the slide member 80, the inner circumference of the annular portion 71 and the outer circumference of the slide member 80 defining a minute gap in the radial direction. The projections 72 are portions to urge the slide member 80 in the axial direction, and are arranged along the annular portion 71 in the circumferential direction. More specifically, the projections 72 are plate-like portions protruding radially inward from the radially inner portion of the annular portion 71, forming the support member 70 integrally with the annular portion 71. In this embodiment, the number of the projections 72 is three.

The support member 70 is, as shown in FIG. 2, fixed to an attachment portion 90 provided on the axially transmission-side surface of the front cover 2. The attachment portion 90 is provided at a radially inner portion of the front cover 2, and is an annular portion indented from the neighboring portion toward the engine in the axial direction. The diameter of the attachment portion 90 is larger than that of the support member 70. The axial dimension of the attachment portion 90 is larger than the sheet-metal thickness of the support member 70, for example. Accordingly, the annular portion 71 of the support member 70 is accommodated in the attachment portion 90 so as not to protrude over a side surface 91 of the front cover 2 toward the transmission in the axial direction, thereby further reducing the axial dimension at and around the support member 70.

Furthermore, the annular portion 71 has a plurality of fixing portions 76 arranged in the circumferential direction, as shown in FIG. 3. The fixing portion 76 is a portion of the support member 70 which is fixed to the front cover 2 by spot welding, for example. This makes it possible to fix the support member 70 to the front cover 2 easily and reliably. It is preferable that the fixing portions 76 be located at least radially outward of the projections 72 because the projections 72 urge the slide member 80. This location makes it possible to transmit reliably the urging force of the projections 72 to the slide member 80.

Figure 4:
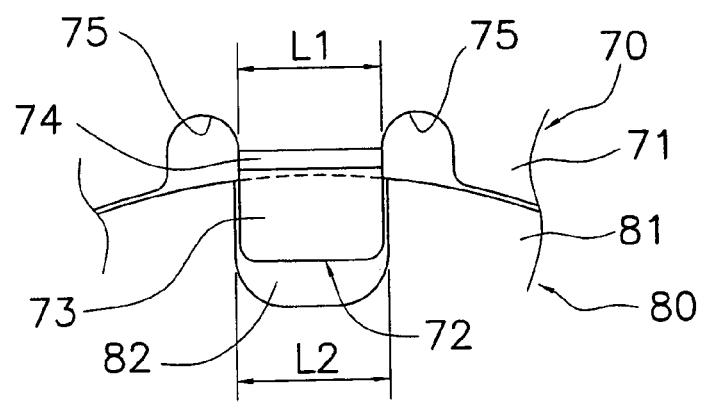
FIG. 4 is a cross-sectional view of the projections 72 and their surroundings cut along A-A in FIG. 2.

(3) Structures of the Engagement Portion between the Projections and the Recesses and its Surroundings A detailed description will be made on an engagement portion between the projections 72 and the recesses 82 and its surroundings. The projections 72 are engaged with the recesses 82, and hold the slide member 80. FIG. 4 is a cross-sectional view of projections 72 and their surroundings cut along A-A in FIG. 2. The projections 72 of the support member 70 are constituted by an urging portion 73 and a bent portion 74. The urging portion 73 is formed at the end of the projection 72, and is in contact with the axial-transmission side surface of the recesses 82. The bent portion 74 is a portion between the urging portion 73 and the annular portion 71, and is bent in the axial direction. The annular portion 71 is formed with cutouts 75 at both circumferential ends of the bases of the projections 72. The cutouts 75 are spaces that are cut out round radially outward from the radially inner end of the annular portion 71. The cutouts 75 are formed to prevent stress concentration when the axial or circumferential loads are applied to the projections 72.

The urging portions 73 of the projections 72 are engaged with the recesses 82 so as to urge them in the axial direction. Since the axial dimension of the recesses 82 is larger than the sheet-metal thickness of the urging portion 73, the urging portion 73 does not come into contact with a member opposite the slide member 80, i.e., the turbine hub 13 in this embodiment. The recesses 82 are formed such that a gap between the urging portion 73 and the recesses 82 in the circumferential direction is very small. For example, as shown in FIG. 4, 0 mm≦L2−L1≦0.2 mm, where the width of the urging portion 73 in the circumferential direction is defined as L1, the width of the recess 82 in the circumferential direction is defined as L2. Accordingly, the support member 70 can more reliably support the slide member 80 in the circumferential direction. Furthermore, since the gap between the projections 72 and the recesses 82 in the circumferential direction are very small, it is possible to reduce wear due to the operations between the projections 72 and the recesses 82 in the circumferential direction. Furthermore, since the support member 70 and the slide member 80 are made of metal, different from the conventional synthetic resin thrust washer, the wear of the projections 72 and the recesses 82 can be prevented.

Figure 5:
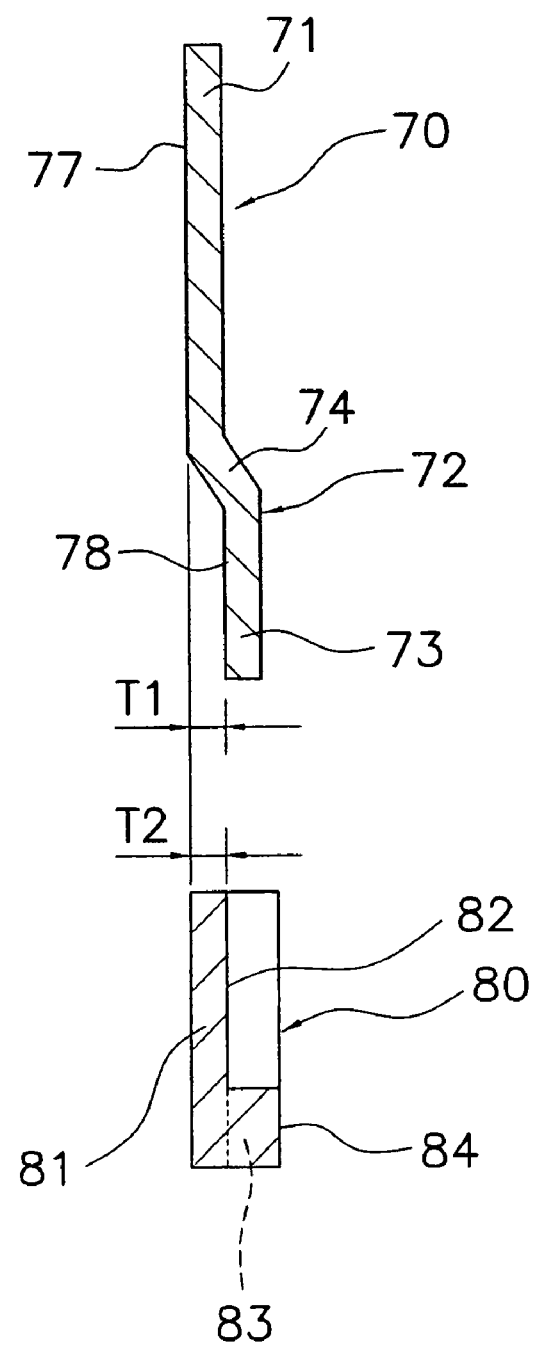
FIG. 5 is a view of the dimensional relationship between the support member 70 and the slide member 80.

The extent of urging force to be applied from the urging portion 73 to the recesses 82 is adjusted by the degree of bending of the bent portion 74. FIG. 5 is a view of a dimensional relationship between the support member 70 and the slide member 80. As shown in FIG. 5, an axial dimension between an attachment surface 77 of the support member 70 and an axial-engine side surface 78 of the urging portion 73 is defined as T1. The sheet-metal thickness of portions of the main body 81 of the slide member 80 corresponding to the recesses 82 is defined as T2. In order to apply the urging force to the slide member 80, it is necessary to deflect the projections 72 in the axial direction when the slide member 80 is attached to the front cover 2 by the support member 70. Therefore, first, it is necessary to achieve T1<T2. Then, in order to apply an appropriate urging force, it is preferable to define the relationship between T1 and T2 in detail. More specifically, if the sheet-metal thickness of the support member 70 is 0.8 mm, for example, it is preferable to adjust the degree of bending of the bent portion 74 such that −0.05≦T1−T2≦−0.45. Accordingly, the support member 70 can apply the appropriate urging force to the slide member 80, thereby stabilizing the support condition of the slide member 80.

(4) Area of the Grooves

The grooves 83 are formed as flow passages for the operating oil, and it is therefore necessary to ensure a cross section area of the grooves 83 in the radial direction to some extent. To achieve it, it is important how to determine an area and depth for the grooves 83. For example, if an area of the grooves 83 is large, the depth of the grooves 83 can be reduced so that the sheet-metal thickness of the slide member 80 can be thinned. Accordingly, if an area of the grooves 83 is enlarged, the axial dimension at and around the slide member 80 can be shortened. Furthermore, if the depth of the grooves 83 is shallow, press work can be employed to form the grooves, i.e., eliminating machine work, thereby reducing the cost. For example, if an area occupied by the grooves 83 is equal to or more than 50% of an area occupied by a sliding surface 84, the depth of the groove 83 is shallow enough to employ press work so that the sheet-metal thickness of the slide member 80 can be thinned. As a result, it is possible to shorten the axial dimension at and around the radially inner portion of the torque converter 1.

5. Operations and Effects

A description will be made on the operations and effects of the torque converter 1. When the torque is input from the engine to the front cover 2, the impeller 3 rotates with the front cover 2. This allows the operating oil to flow from the impeller 3 to the turbine 4 to rotate the turbine 4. The torque of the turbine 4 is transmitted to the main drive shaft (not shown). At this time, since the axial load toward the engine is applied to the turbine hub 13 through the operating oil, the turbine hub 13 tends to move toward the engine in the axial direction. Meanwhile, the front cover 2 and the turbine hub 13 rotate relative to each other at various relative speeds. However, since the slide member 80 is provided between the front cover 2 and the turbine hub 13 in the axial direction and is supported by the support member 70, the turbine hub 13 slides against the slide member 80, rotating relative to the front cover 2 without any contact. At the time, since the slide member 80 is urged by the projections 72 of the support member 70 against the front cover 2, the slide member 80 neither rotates relative to the front cover 2 nor the support member 70, thereby preventing the wear of the engagement portion.

During the operation of the torque converter 1, the operating oil is supplied into the first hydraulic chamber 36 from the radially inner portion. At this time, the operating oil flows radially outward through the grooves 83 of the slide member 80. The operating oil flows radially outward in the first hydraulic chamber 36, then flows toward the transmission in the axial direction, and finally flows into the fluid operating chamber (torus). Accordingly, the piston 22 is moved farthest from the turbine 4 in the axial direction, and the friction facing 35 of the piston 22 is apart from the friction surface 2a of the front cover 2. Note that the operating oil in the fluid operating chamber is exhausted between the radially inner portions of the turbine 4 and the stator 5.

When the lock-up is engaged, the oil circuit is switched to drain the operating oil in the first hydraulic chamber 36 from the radially inner portion thereof. At this time, the operating oil flows radially inward through the grooves 83 of the slide member 80. Accordingly, the hydraulic pressure in the first hydraulic chamber 36 becomes lower than that of the second hydraulic chamber 37. As a result, the piston 22 is moved toward the front cover 2 so that the friction facing 35 is forcefully pressed against the friction surface 2a of the front cover 2. Note that during this time the operating oil is supplied into the fluid operating chamber between the radially inner portions of the impeller 3 and the stator 5.

6. Summary of the Operations and Effects

In summary, the operations and effects of the torque converter 1 according to the present invention are as follows.

In the torque converter 1, since the slide member 80 is urged against and supported by the support member 70, it is unnecessary to provide a stepped portion in the front cover 2 into which a thrust washer is fitted, unlike the conventional art. Consequently, the sheet-metal thickness of the slide member 80 can be thinned, thereby shortening the axial dimension at and around the radially inner portion of the torque converter 1. Moreover, in the torque converter 1, since the support member 70 is formed with the projections 72, it is possible to urge the slide member 80 in the axial direction at a plurality of points, thereby more reliably supporting the slide member 80. Furthermore, in the torque converter 1, since the projections 72 are elastically deformed in the axial direction, the projections 72 can apply the urging force to the slide member 80 by their elastic force. Consequently, it is possible to restrict easily the movement of the slide member 80 in the axial and circumferential directions.

In the torque converter 1, since the support member 70 is formed with the recesses 82 to be engaged with the projections 72, the projections 72 and the recesses 82 can be engaged with each other in the circumferential direction. As a result, the slide member 80 can be supported by the support member 70 against the front cover 2 so as to be relatively unrotatable. Furthermore, in the torque converter 1, since the sheet-metal thickness of the projections 72 can be accommodated within the axial dimension of the recesses 82, the projections 72 do not contact with a member opposite the slide member 80. Furthermore, in the torque converter 1, since the projection 72 includes the urging portion 73 and the bent portion 74, it is possible to adjust the amount of elastic deformation of the projections 72 at the attachment by the degree of bending of the bent portion 74 in order to adjust the urging force.

In the torque converter 1, since the gap between the projections 72 and the recesses 82 in the circumferential direction is in the range between 0 mm to 0.2 mm, it is possible to restrict more reliably the movement of the slide member 80 in the circumferential direction by the support member 70. Accordingly, the wear of the engagement portion between the projections 72 and the recesses 82 in the circumferential direction can be reduced. Furthermore, in the torque converter 1, since an area occupied by the grooves 83 is equal to or more than 50% of a sliding area, the depth of the groove 83 can be shallower compared to the conventional art. As a result, the sheet-metal thickness of the slide member 80 can be thinned. Furthermore, in the torque converter 1, since the depth of the groove 83 can be shallower compared to the conventional art, it is possible to employ press work even if the slide member 80 is made of metal, thereby reducing the cost compared to machine work.

In the torque converter 1, since the slide member 80 is made of metal, it is possible to thin the sheet-metal thickness compared to the conventional synthetic resin thrust washer while ensuring the strength. In addition, in the torque converter 1, since the support member 70 is made of metal, the sheet-metal thickness of the support member 70 can be thinned, too. Furthermore, in the torque converter 1, since the slide member 80 and the support member 70 are made of metal, the wear of the engagement portion between the support member 70 and the slide member 80 can be prevented.

The above-described structures of the support member 70 and the slide member 80 make it possible to reduce the axial dimension at and around the radially inner portion of the torque converter 1.

7. Other Embodiments

The present invention is not limited to the above-described embodiment, and various modifications and alternations are possible within the scope of the present invention. Below, other embodiments will be described.

(1) The member to which the support member is fixed

Although the support member 70 is fixed to the front cover 2 in the above-described embodiment, the support member 70 may be fixed to the turbine hub 13.

(2) The number of the grooves

Although the number of the grooves 83 is six in the above-described embodiment, the number may be other than six.

(3) The number of the projections and depressions

Although the number of sets of the projections 72 and the recesses 82 is three in the above-described embodiment, the number may be other than three.

(4) The positional relationship between the support member and the slide member

Although the support member 70 is located radially outward of the slide member 80 in the above-described embodiment, the support member 70 may be located radially inward of the slide member 80.

INDUSTRIAL APPLICABILITY

The present invention can be applied to hydrodynamic torque transmitting devices, particularly to devices having a lock-up clutch, because the axial dimension at and around the radially inner portion of the hydrodynamic torque transmitting device can be reduced.

The invention claimed is:

1. A hydrodynamic torque transmitting device for transmitting torque from an engine to an output shaft extending toward a transmission through fluids, comprising:
   a front cover being configured to receive the torque from the engine, the front cover being located on an engine side of the hydrodynamic torque transmitting device;
   an impeller being located on a transmission side of the front cover, the impeller forming a fluid chamber with the front cover and having a plurality of blades on an inner surface thereof;
   a turbine being located in the fluid chamber on an engine side of the impeller, the turbine being configured to output the torque to the output shaft, the turbine including a turbine shell being located opposite the impeller and being provided with a plurality of blades, and a turbine hub located at a radially inner end of the turbine shell to couple the turbine shell with the output shaft;
   an annular slide member being located between the front cover and the turbine hub in the axial direction to receive the axial load, the slide member being formed with recesses and a plurality of grooves penetrating in the radial direction, and the grooves being located between the recesses in the circumferential direction, and an area occupied by the grooves in the slide member being equal to or more than 50% of a sliding area in the slide member; and
   a support member being fixed to one of the front cover and the turbine hub to support the slide member by urging the slide member in the axial direction against one of the front cover and the turbine hub.

2. The hydrodynamic torque transmitting device according to claim 1, wherein the support member includes an annular portion, and a plurality of projections projecting from the annular portion in the radial direction to urge the slide member in the axial direction.

3. The hydrodynamic torque transmitting device according to claim 1, wherein the support member is located radially outward of the slide member.

4. The hydrodynamic torque transmitting device according to claim 3, wherein the support member includes projections and a gap between the projections and the recesses in the circumferential direction is in the range between 0 mm and 0.2 mm.

5. The hydrodynamic torque transmitting device according to claim 1, wherein the slide member and the support member are made of metal.

6. A hydrodynamic torque transmitting device for transmitting torque from an engine to an output shaft extending toward a transmission through fluids, comprising:
   a front cover being configured to receive the torque from the engine, the front cover being located on an engine side of the hydrodynamic torque transmitting device;
   an impeller being located on a transmission side of the front cover, the impeller forming a fluid chamber with the front cover and having a plurality of blades on an inner surface thereof;
   a turbine being located in the fluid chamber on an engine side of the impeller, the turbine being configured to output the torque to the output shaft, the turbine including a turbine shell being located opposite the impeller and being provided with a plurality of blades, and a turbine hub located at a radially inner end of the turbine shell to couple the turbine shell with the output shaft:
   an annular slide member being located between the front cover and the turbine hub in the axial direction to receive the axial load, the slide member formed with a plurality of recesses; and
   a support member being fixed to one of the front cover and the turbine hub to support the slide member by urging the slide member in the axial direction against one of the front cover and the turbine hub, the support member including an annular portion and a plurality of projections projecting from the annular portion in the radial direction to urge the slide member in the axial direction, the plurality of recesses being engaged with the projections.

7. The hydrodynamic torque transmitting device according to claim 6, wherein the projections are elastically deformed in the axial direction to urge the slide member.

8. The hydrodynamic torque transmitting device according to claim 7, wherein the slide member is formed with a plurality of grooves penetrating in the radial direction, and the grooves are located between the recesses in the circumferential direction.

9. The hydrodynamic torque transmitting device according to claim 7, wherein each projection includes an urging portion engaged with a respective recess to urge the slide member, and a bent portion bent in the axial direction to couple the annular portion with the urging portion.

10. The hydrodynamic torque transmitting device according to claim 9, wherein the support member is located radially outward of the slide member.

11. The hydrodynamic torque transmitting device according to claim 10, wherein the slide member is formed with a plurality of grooves penetrating in the radial direction, and the grooves are located between the recesses in the circumferential direction.

12. The hydrodynamic torque transmitting device according to claim 11, wherein a gap between the projections and the recesses in the circumferential direction is in the range between 0 mm and 0.2 mm.

13. The hydrodynamic torque transmitting device according to claim 12, wherein an area occupied by the grooves in the slide member is equal to or more than 50% of a sliding area in the slide member.

14. The hydrodynamic torque transmitting device according to claim 13, wherein the slide member and the support member are made of metal.

15. The hydrodynamic torque transmitting device according to claim 11, wherein an area occupied by the grooves in the slide member is equal to or more than 50% of a sliding area in the slide member.

16. The hydrodynamic torque transmitting device according to claim 6, wherein each projection includes an urging portion engaged with a respective recess to urge the slide member, and a bent portion bent in the axial direction to couple the annular portion with the urging portion.

17. The hydrodynamic torque transmitting device according to claim 6, wherein the slide member is formed with a plurality of grooves penetrating in the radial direction, and the grooves are located between the recesses in the circumferential direction.

18. The hydrodynamic torque transmitting device according to claim 17, wherein an area occupied by the grooves in the slide member is equal to or more than 50% of a sliding area in the slide member.

19. The hydrodynamic torque transmitting device according to claim 6, wherein a gap between the projections and the recesses in the circumferential direction is in the range between 0 mm and 0.2 mm.

20. The hydrodynamic torque transmitting device according to claim 19, wherein an area occupied by the grooves in the slide member is equal to or more than 50% of a sliding area in the slide member.

* * * * *